UNITED STATES PATENT OFFICE 2,146,408

QUATERNARY AMMONIUM COMPOUNDS AND PROCESS OF PREPARING THE SAME

Joseph Harrel Shipp, Wilmington, Del., assignor to E. I. du Pont de Nemours & Company, Wilmington, Del., a corporation of Delaware No Drawing. Application January 13, 1938, Serial No. 184,765

14 Claims. (Cl. 260—296)

This invention relates to the production of novel compounds of the general formula R—CONH—CH$_2$—N(tert)—X wherein R stands for an alkyl radical containing not less than 8 carbon atoms; the group N(tert) represents the molecule of a tertiary base, such as trimethylamine or pyridine; and X represents the acidic radical of a weak acid as typified by acetic or formic.

It is an object of this invention to produce compounds of the above general formula wherein the tertiary base is neutralized by the acid radical of a weak acid, that is an acid having a dissociation constant less than 0.01. Other and further objects of this invention will appear as the description proceeds.

In the copending application of A. W. Baldwin and E. E. Walker, Serial No. 141,868, filed May 10, 1937, (or the corresponding British Patent No. 475,170) a novel series of compounds is disclosed and claimed, which is characterized by the general formula R—CONH—CH$_2$—N(tert)—X, wherein R and N(tert) have the same significance as above, while X stands for a monovalent acid group. As illustrations of X in said copending application are mentioned the anions of hydrochloric, hydrobromic, nitric, sulfuric, m-nitrobenzene-sulfonic, and oxalic acids. All these are relatively strong acids. Oxalic acid, which is probably the weakest of the group, has a dissociation constant K=0.038.

The mode of synthesis for these compounds as described in said copending application consists of heating together an acylamidomethylol compound, for instance stearoamidomethanol with a salt of pyridine corresponding to the final salt desired, for instance pyridine hydrochloride, in an excess of the free base. The reaction apparently proceeds according to the following equation:

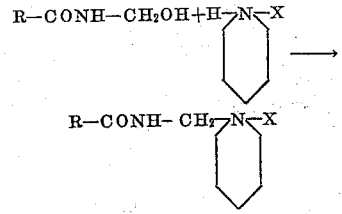

Unfortunately, it has been found, that the said mode of synthesis does not apply where the acid radical selected for X is the radical of a weak acid, for instance acetic or formic.

On the other hand, I have found that for the purpose for which the compounds of the above general formula are destined, that is for the purpose of imparting water-repellency to textile fiber, quaternary salts of the above general formula wherein X is the radical of a weak acid are superior to similar compounds wherein X is the radical of a strong acid. The compounds derived from a strong acid, when applied to textile fiber in accordance with the teachings of said patent application for the sake of imparting thereto permanent water-repellent properties, have a tendency to weaken the fiber. The quaternary salts of the weak acids on the other hand do not possess this disadvantageous quality, as is more fully described in my copending application Serial No. 184,766 of even date herewith. It is clear therefore that the synthesis of compounds of the above general formula wherein X designates the radical of a weak acid constitutes an important problem of practical technical merit.

I have now found that compounds of the above general formula wherein X is the radical of a weak acid, may be readily prepared by following a synthesis as set forth in detail hereinbelow.

I have found that the desired compounds may be prepared by reacting together first, the amide of a higher fatty acid, for instance stearamide, with formaldehyde and the desired acid of the formula HX, for instance acetic or formic, in the presence of a liquid diluent, which may indeed be constituted by an excess of the acid. The resulting intermediate product is then further reacted with the desired tertiary base, for instance pyridine, while maintaining an excess of diluent throughout the reaction. In this step, an excess of the base may serve as the diluent.

As an alternative to the above two-step procedure I may also react jointly all four reactants, namely, long-chain alkyl-amide, formaldehyde, acid of formula HX, and tertiary base in one step, in the presence of excess acid or base throughout the reaction period. Part of the excess acid or base may if desired be replaced by an inert liquid diluent. This alternative procedure is particularly desirable in cases where the weak acid employed is a solid at the operating temperature, for instance in the case of salicyclic, lactic, sulfanilic, tartaric or phthalic acids, or in the case of phthalic anhydride. The reaction apparently proceeds in two steps forming first an intermediate ester of the methanol compound and the acid, which then adds on the tertiary base to form a quaternary compound as illustrated by the following equations using acetic acid as an example:

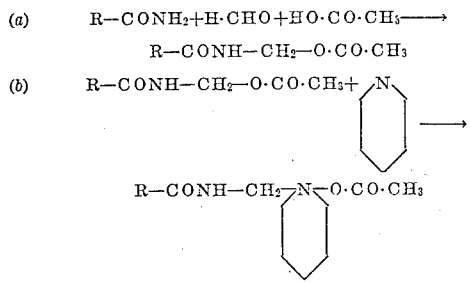

(a) R—CONH$_2$+H·CHO+HO·CO·CH$_3$ ⟶
    R—CONH—CH$_2$—O·CO·CH$_3$ (b) R—CONH—CH$_2$—O·CO·CH$_3$ + N⟨ ⟩ ⟶
    R—CONH—CH$_2$—N⟨ ⟩—O·CO·CH$_3$

It will be understood, however, that the above theory is offered merely to facilitate understanding the disclosure, without any intent whatever to limit my invention thereto.

The details of actual procedure may be varied within limits. For instance, in lieu of the free acid, the corresponding anhydrides may be employed where these are readily available, as for instance in the cases of acetic anhydride and phthalic anhydride. On the other hand, the acid may be diluted with water, if desired. Excessive quantities of water should be avoided, but small quantities, up to, say, 15 or 20% by weight of the acid, do no harm and are in fact helpful in certain cases in that they facilitate liquification of the mass at the operating temperature.

The temperature of the reaction may vary within wide limits. The preferred temperature range is between 60 and 85° C. Temperatures as high as 90° C. can be used for a short time, and temperatures as low as 60° C. are satisfactory if sufficient time is allowed. By working in an autoclave, somewhat higher temperatures may be employed.

Of the acids particularly considered for this invention the following may be mentioned: acetic, formic, lactic, salicylic, chloro-acetic, bromoacetic, sulfanilic, tartaric, phthalic, glycollic. In general any acid having a dissociation constant less than 0.01 may be employed. Thus, the dissociation constants for the particular acids named above lie roughly between 0.00001 and 0.002.

Another requisite of the acid is that it be liquid or capable of melting or dissolution in an organic diluent at the temperature of the reaction, if necessary by the further aid of a little water. As already mentioned the diluent may be an inert organic diluent or an excess of the tertiary base.

The tertiary base may be any of those employed in said British Patent No. 475,170, for instance pyridine or quinoline, or other types, for instance trimethylamine, triethanolamine, etc.

The acylamide and source of formaldehyde may likewise follow the optional variations indicated in said copending application. Thus, the acylamide may be any compound of the general formula R-CONH$_2$ wherein R is an alkyl radical possessing not less than 7 carbon atoms, for instance lauramide, stearamide, and the amide of oleic acid. As a source of formaldehyde there may be used commercial paraformaldehyde.

The amount of acid used in the above process can be varied over a wide range. Where the acid is liquid or capable of melting, it is usually desirable to use a quantity sufficient to dissolve the product formed by the interaction of the amide, paraformaldehyde and acid. An amount of acetic acid equal in weight to from 1 to 4 times the amount of amide used is satisfactory. Two parts by weight of acetic acid to one part of amide works very well and may be considered the preferred ratio. However, it is possible to use inert solvents and thus decrease the amount of acid used. Thus the chlorinated aliphatic compounds such as ethylene dichloride, tetrachlorethane, perchlor-ethylene, chloroform, and other solvents are suitable for this purpose and their use makes it possible to employ a weight of acid not appreciably greater than the weight of amide.

Likewise the amount of pyridine used can be varied and it can also be used with or without the addition of solvents such as those mentioned above. It is generally preferable to use a weight of pyridine equal to the weight of acid present. But where the base has to serve as a solvent for the acid or anhydride employed, it is clearly desirable to use an excess thereof, say from 1 to 4 times the weight of the acid employed.

The paraformaldehyde should best be used in an excess ranging from 10 to 50% of the theoretical based on the quantity of acyl amide.

The novel compounds are characterized by being water-soluble (the initial acyl amides are not water-soluble) and by giving foaming solutions. Furthermore, when applied to textile material which is then heated in the absence of moisture according to the process of British Patent No. 477,991, they impart thereto permanent water-repellent characteristics.

The novel compounds crystallize out from the reaction mass, but are not readily isolable in dry form without decomposition. It is better therefore to leave them in the reaction mass and use the latter as a whole in the process of treatment of fabric to impart thereto water-repellent properties as above indicated; or, if desired, the bulk of the crystals may be separated from the liquid mass by decanting, filtering or centrifuging without drying.

Without limiting my invention to any particular procedure the following examples in which parts by weight are given will serve to illustrate my preferred mode of operation.

*Example I*

10 parts of stearamide, 2 parts of para-formaldehyde and 20 parts of glacial acetic acid were heated, in a flask with a reflux condenser attached, for 40 minutes at 80° C. At the end of this time a homogeneous solution had formed. 10 parts of pyridine were then added and the heating was continued for 3 hours. From time to time one-drop samples were removed and tested for solubility by adding the same to 10 cc. of water at a temperature of 40 to 50° C. and observing whether an insoluble residue remained. The final sample readily formed a paste with water and dissolved to form an opalescent solution which foamed copiously on stirring. Presumably, the final product was largely stearamido-methyl-pyridinium acetate.

This product was tested for its capacity to impart water-repellency to cotton fabric as more fully described in Example XIII below. The test gave excellent results without any appreciable tendering of the fabric.

*Example II*

A mixture of 10 parts of stearamide, 2 parts of para-formaldehyde and 20 parts of 90% formic acid was heated for one hour at 80° C. The mixture did not completely dissolve but remained as a thin heterogeneous paste. Next, 10 parts of pyridine was added and the heating continued for two hours. At the end of this time the sample was water soluble. The product, presumably stearamido-methyl-pyridinium formate, was applied to a broadcloth fabric and tested for its capacity to impart water repellency, by the methods described in Example XIII. The product was found to give excellent water repellency, without appreciably tendering the fiber.

Example III

A mixture of 10 parts of stearamide, 2 parts of para-formaldehyde and 10 parts of 85% acetic acid were heated in a flask with a reflux condenser at 80° C. for 30 minutes. The mass dissolved completely in this time. 10 parts of pyridine was then added and the heating continued for 2 hours. At the end of this time the sample was almost completely water-soluble but was inferior in solubility to the products described in Examples I and II.

Example IV

A mixture of 10 parts of the amides derived from hydrogenated peanut oil by treatment with ammonia in the presence of a catalyst, 2 parts of para-formaldehyde and 20 parts of 90% formic acid were heated for 1 hour at 80° C. At the end of this time 10 parts of pyridine were added and the heating continued for 2 hours more. At the end of this heating period the product dissolved completely in water to give a slightly milky opalescent solution. A cotton fabric was impregnated with a 2% solution of this product, dried and baked for 20 minutes at 120° C. The fabric was then boiled for 1 hour in a solution containing 0.25% soap and 0.10% soda ash. After drying the fabric was found to have excellent water repellency and was not appreciably tendered. The fabric was also permanently softened by this treatment.

Example V

A mixture of 10 parts of lauramide, 2 parts of para-formaldehyde and 20 parts of acetic acid were heated 1 hour at 80° C. at which time complete solution had occurred. At this stage 5 parts of pyridine were added and heating was continued for 2 hours more, as which time the product was found to be soluble in water.

Example VI

A mixture of 10 parts of stearamide, 2 parts para-formaldehyde and 20 parts of hydroxyethanoic acid (glycollic acid) were heated at 85° C. for 2 hours. A pasty product formed but complete solution did not occur. The mixture was shaken and stirred several times during the heating. At the end of the 2 hours 20 parts of pyridine were added and the heating continued for 3 hours. A paste was formed but the mass did not dissolve. The product formed a milky solution or dispersion in water, but this was not stable for more than a few minutes. However, this solution gave a fairly good permanent water-repellent effect when applied to a white gaberdine fabric by the process described above.

Example VII

The following mixture was heated at 80° C. for 3 hours:

|  | Parts |
|---|---|
| Stearamide | 10 |
| Paraformaldehyde | 2 |
| Salicylic acid | 20 |
| Pyridine | 20 |

At the end of this period the product was found to be partially water-soluble and to give foaming solutions suitable for producing permanent water-repellent effects on textiles.

Example VIII

The following mixture is heated for 3 hours at 80° C.

|  | Parts |
|---|---|
| Stearamide | 10 |
| Paraformaldehyde | 2 |
| Chloracetic acid | 20 |
| Pyridine | 20 |

A bright red color developed which gradually changed to a dark brown. The final product was completely water-soluble and gave solutions which foamed copiously. When this product was used for treating a fabric according to the process of Example XIII below, a permanent water repellent finish was obtained.

Example IX

The following mixture was heated for 3 hours at 80° C.

|  | Parts |
|---|---|
| Stearamide | 10 |
| Paraformaldehyde | 2 |
| Sulfanilic acid | 20 |
| Pyridine | 20 |

When these reactants were mixed a scarlet red color developed but gradually changed to bright yellow on heating. The final product was water soluble and was found useful for producing permanent water repellent and permanent soft finishes on textiles.

Example X

The following mixture was heated for 3 hours at 80° C.

|  | Parts |
|---|---|
| Stearamide | 10 |
| Paraformaldehyde | 2 |
| Phthalic anhydride | 20 |
| Pyridine | 20 |

At the end of this time the product was completely water soluble and gave strongly foaming solutions. On cooling, the product solidified to a mass of wet crystals light amber in color.

Example XI

The following mixture was heated for 3 hours at 80° C.

|  | Parts |
|---|---|
| Stearamide | 10 |
| Paraformaldehyde | 2 |
| Tartaric acid | 10 |
| Pyridine | 20 |

The tartaric acid did not completely dissolve in this mixture, but the final product was completely water soluble and gave foaming solutions suitable for producing water repellent finishes.

Example XII

The following mixture was heated for 3 hours at 80° C.

|  | Parts |
|---|---|
| Stearamide | 10 |
| Paraformaldehyde | 2 |
| Citric acid | 10 |
| Pyridine | 20 |

This product was water soluble and gave foaming solutions suitable for treating textiles to obtain water repellent finishes.

In a similar manner other quaternary compounds of weak acids of the above general formula may be prepared. In the case of the lower fatty acids, the solubility of the resulting compound decreases as the length of the chain in the acid radical increases. However, this effect may be overcome by selecting an acid which has additional solubilizing groups such as hydroxy groups. Thus lactic and tartaric acids, give satisfactory products. Furthermore the less soluble products may be applied to fabrics from organic solvent solutions, as is the case, for instance, with the compounds derived from butyric acid.

In the following additional example is shown the method of applying the novel compounds to the fabric for the purpose of imparting thereto water-repellent characteristics.

Example XIII

Broadcloth fabric was steeped in an aqueous solution containing 1% of the compound prepared in Example I. The excess moisture was then squeezed out by a wringer, and the cloth was dried at 40° C. The fabric was then heated in an oven for 20 minutes at 102° C. It was then given a soap-wash, and was rinsed and ironed dry.

The fabric thus obtained was found to be water-repellent, and this effect was not removed by subsequent laundering. The tendering effect upon the fabric was not much more serious than by ordinary washing.

A similar test carried out with a 4% aqueous solution of the compound obtained in Example I gave substantially similar results.

It will be understood that many variations and modifications may be made in the details of procedure above set forth without departing from the spirit of this invention.

I claim:

1. A compound of the general formula

R—CONH—CH$_2$—N(tert)—X wherein R stands for an alkyl radical containing not less than 7 carbon atoms, the group N(tert) represents the molecule of a tertiary base, and X stands for the organic acid radical of an acid having a dissociation constant less than 0.01.

2. A compound as in claim 1, wherein X stands for the acid radical of an organic acid whose dissociation constant is between 0.00001 and 0.002.

3. A compound of the general formula

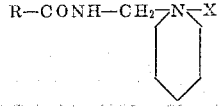

wherein X stands for the radical of an organic carboxylic acid having a dissociation constant between 0.00001 and 0.002, while R stands for an alkyl radical having not less than 7 carbon atoms.

4. Stearamido-methyl-pyridinium acetate.
5. Stearamido-methyl-pyridinium formate.
6. Stearamido-methyl-pyridinium phthalate.
7. The process of producing a quaternary ammonium salt of a weak acid, which comprises reacting an organic amide of the general formula R—CONH$_2$ wherein R is an alkyl radical of not less than 7 carbon atoms, with formaldehyde and an organic acid having a dissociation constant less than 0.01, and further reacting the intermediate compound thus produced with a tertiary base.

8. The process of producing a compound of the general formula R—CONH—CH$_2$N(tert)—X, wherein R is an alkyl radical of not less than 7 carbon atoms, N(tert) represents the molecule of a tertiary base, and X is the acidic radical of an organic acid whose dissociation constant is less than 0.01, which comprises reacting an alkyl amide of the formula R—CONH$_2$, wherein R has the same significance as above, with an acid of the formula HX which is capable of being brought into liquid state at a temperature between 60 and 90° C., and in which X has the same significance as above, in the presence of formaldehyde and an excess of said acid, and further reacting the intermediate compound thus produced with a tertiary base.

9. A process as in claim 8, the acid HX being liquified by the aid of an organic liquid diluent, and the reaction being carried out in an excess of said liquid diluent.

10. A process as in claim 9, the tertiary base being mixed initially with the reaction mass comprising the alkyl amide, formaldehyde and weak acid, whereby to act upon the intermediary reaction product in situ as soon as it is produced.

11. A process for producing a pyridinium compound adapted to impart water-repellent characteristics to cellulosic fiber, which comprises reacting a long chain alkyl amide having not less than 7 carbon atoms in the alkyl chain, with formaldehyde and an organic carboxylic acid having a dissociation constant between 0.00001 and 0.002 and being capable of liquification by the aid of water at a temperature between 60 and 90° C., said carboxylic acid being used in excess to furnish a diluent for the reaction mass, and then reacting the intermediate reaction product thus produced with pyridine.

12. The process which comprises reacting stearamide, formaldehyde and acetic acid at a temperature between 70 and 85° C. in an excess of acetic acid, and then further reacting the mixture so obtained with pyridine until a water-soluble reaction product has been obtained.

13. The process which comprises reacting stearamide, formaldehyde and formic acid at a temperature between 70 and 85° C. in an excess of formic acid, and then further reacting the mixture so obtained with pyridine until a water-soluble reaction product has been obtained.

14. The process which comprises heating together stearamide, formaldehyde, phthalic anhydride and pyridine, in an inert organic diluent at a temperature between 70 and 85° C., until a water-soluble, foaming reaction product has been obtained.

JOSEPH HARREL SHIPP.